US012671741B1

(12) United States Patent
Yungelson

(10) Patent No.: US 12,671,741 B1
(45) Date of Patent: Jun. 30, 2026

(54) MITIGATION OF MISSING SESSION DATA FOR ROUTING SESSION

(71) Applicant: Juniper Networks, Inc., Sunnyvale, CA (US)

(72) Inventor: Anna Yungelson, Lexington, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 180 days.

(21) Appl. No.: 18/542,203

(22) Filed: Dec. 15, 2023

Related U.S. Application Data

(60) Provisional application No. 63/510,802, filed on Jun. 28, 2023, provisional application No. 63/491,031, filed on Mar. 17, 2023.

(51) Int. Cl.
*H04L 12/28* (2006.01)
*H04L 43/106* (2022.01)
*H04L 67/145* (2022.01)
*H04L 67/146* (2022.01)

(52) U.S. Cl.
CPC .......... *H04L 67/145* (2013.01); *H04L 43/106* (2013.01); *H04L 67/146* (2013.01)

(58) Field of Classification Search
CPC .... H04L 67/145; H04L 43/106; H04L 67/146
See application file for complete search history.

(56) References Cited

U.S. PATENT DOCUMENTS 8,254,271 B1 * 8/2012 Nadeau ............... H04L 43/0811
370/241.1
8,953,437 B1 * 2/2015 Tiruveedhula .......... H04L 45/50
370/389

| 9,729,439 B2 | 8/2017 | MeLampy et al. |
| 9,762,485 B2 | 9/2017 | Kaplan et al. |
| 9,832,082 B2 | 11/2017 | Dade et al. |
| 10,200,264 B2 | 2/2019 | Menon et al. |
| 10,277,506 B2 | 4/2019 | Timmons et al. |
| 10,958,537 B2 | 3/2021 | Safavi |

(Continued)

OTHER PUBLICATIONS

"Transmission Control Protocol," DARPA Internet Program Protocol Specification, Sep. 1981, RFC 793, 90 pp.

(Continued)

*Primary Examiner* — Brian J. Gillis
*Assistant Examiner* — Juan C Turriate Gastulo
(74) *Attorney, Agent, or Firm* — Shumaker & Sieffert P. A.

(57) ABSTRACT

Techniques are disclosed for mitigating lost state data for a communication session by a network device performing session-based routing. For example, in response to determining a first network device has not received packets of a reverse packet flow of a session from a second network device, the first network device sends, to the second network device, a first packet including first metadata comprising a first control message querying a health of the session. The first network device receives, from the second network device, a second control message requesting second metadata for reestablishing the session, the second control message sent in response to the first control message. The first network device sends a second packet of the forward packet flow including the second metadata for reestablishing the session to the second network device. The second network device recovers lost state data for the session using the second metadata.

20 Claims, 9 Drawing Sheets

(56) References Cited

U.S. PATENT DOCUMENTS

| | | | | |
|---|---|---|---|---|
| 10,958,585 | B2 | 3/2021 | Safavi | |
| 10,985,969 | B2 | 4/2021 | Safavi | |
| 2014/0204918 | A1* | 7/2014 | Ha | H04W 28/14 |
| | | | | 370/336 |
| 2014/0258441 | A1* | 9/2014 | L'Heureux | H04L 67/306 |
| | | | | 709/217 |
| 2017/0041231 | A1* | 2/2017 | Seed | H04W 4/80 |
| 2019/0386959 | A1 | 12/2019 | Menten et al. | |
| 2020/0170055 | A1* | 5/2020 | Dou | H04W 76/22 |
| 2020/0403890 | A1 | 12/2020 | McCulley et al. | |
| 2023/0069337 | A1* | 3/2023 | Lee | H04L 61/4511 |
| 2023/0116163 | A1 | 4/2023 | Scholz et al. | |
| 2024/0259255 | A1* | 8/2024 | Hegde | H04L 41/0654 |

OTHER PUBLICATIONS

Katz et al., "Bidirectional Forwarding Detection (BFD) for IPV4 and IPV6 (Single Hop)," Internet Engineering Task Force (IETF), RFC 5881, Jun. 2010, 7 pp.

Katz et al., "Bidirectional Forwarding Detection (BFD)," Internet Engineering Task Force (IETF), RFC 5880, Jun. 2010, 49 pp.

Menon et al. "Secure Vector Reouting (SVR)," draft-menon-svr-00, Network Working Group, Internet-Draft, Oct. 1, 2021, 38 pp.

Menon et al., "Secure Vector Routing (SVR)," Internet-Draft, draft-menon-svr-01 Internet Engineering Task Force (IETF), Mar. 29, 2022, 65 pp.

Menon et al., "Secure Vector Routing (SVR)," Internet-Draft, draft-menon-svr-02 Internet Engineering Task Force (IETF), Sep. 20, 2022, 84 pp.

Menon et al., "Secure Vector Routing (SVR)," Internet-Draft, draft-menon-svr-03 Internet Engineering Task Force (IETF), Sep. 28, 2023, 103 pp.

Postel "User Datagram Protocol," Network Working Group, Internet Engineering Task Force, RFC 768, Aug. 28, 1980, 3 pp.

International Search Report and Written Opinion of International Application No. PCT/US2024/019973 dated May 14, 2024, 13 pp.

International Preliminary Report on Patentability from International Application No. PCT/US2024/019973 dated Oct. 2, 2025, 6 pp.

* cited by examiner

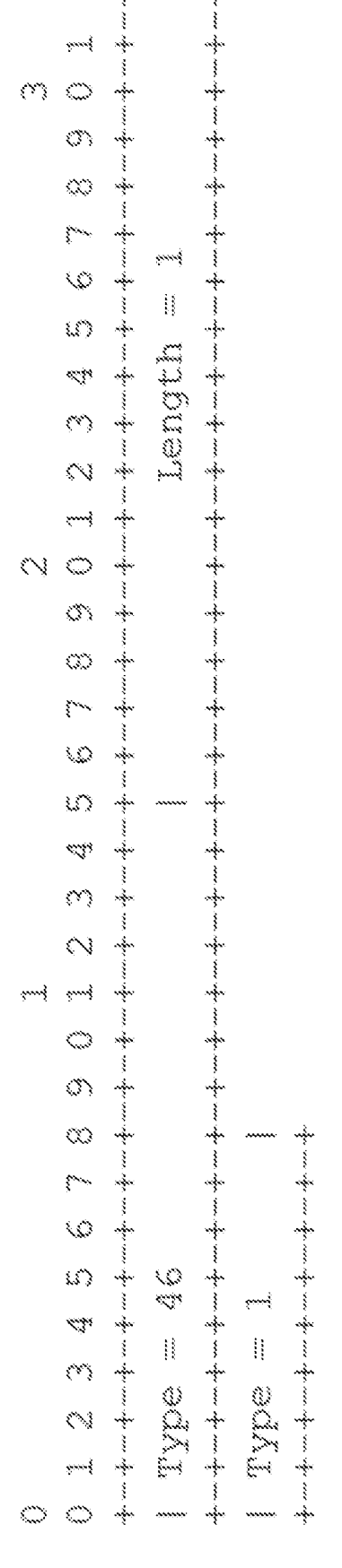
```
New Metadata Attribute - Session-health-check
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 | Type = 46                             |           Length = 1  |
 +-+-+-+-+-+-+-+-+-+-+-+-+-+-+-+-+-+-+-+-+-+-+-+-+-+-+-+-+-+-+-+-+
 | Type = 1  |
 +-+-+-+-+-+-+
The types are defined as
request = 1
request-timeout = 2
```
FIG. 3A

360

*Existing Metadata Attribute – Forced Drop*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type = 24                     |         Length = 1            |
+-+-+-+-+-+-+-+-+-+-+-+-+-+-+-+-+-+-+-+-+-+-+-+-+-+-+-+-+-+-+-+-+
| Reason        |
+-+-+-+-+-+-+-+-+
```

Forced-drop-reason:
enable-metadata = 2
delete-session = 6
session-health-check = 8

301

309

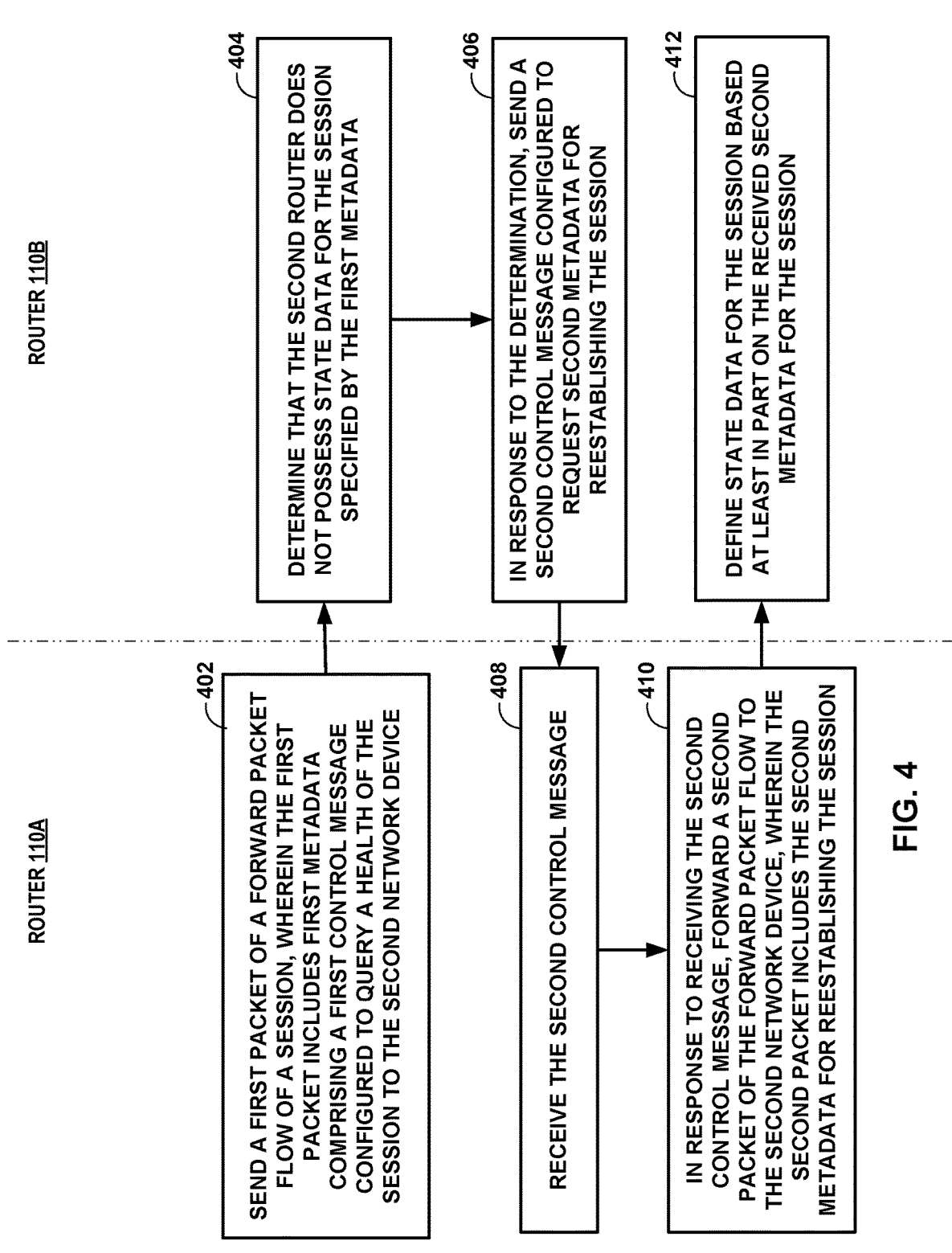

ROUTER 110B

404

DETERMINE THAT THE SECOND ROUTER DOES NOT POSSESS STATE DATA FOR THE SESSION SPECIFIED BY THE FIRST METADATA

406

IN RESPONSE TO THE DETERMINATION, SEND A SECOND CONTROL MESSAGE CONFIGURED TO REQUEST SECOND METADATA FOR REESTABLISHING THE SESSION

412

DEFINE STATE DATA FOR THE SESSION BASED AT LEAST IN PART ON THE RECEIVED SECOND METADATA FOR THE SESSION

ROUTER 110A

402

SEND A FIRST PACKET OF A FORWARD PACKET FLOW OF A SESSION, WHEREIN THE FIRST PACKET INCLUDES FIRST METADATA COMPRISING A FIRST CONTROL MESSAGE CONFIGURED TO QUERY A HEALTH OF THE SESSION TO THE SECOND NETWORK DEVICE

408

RECEIVE THE SECOND CONTROL MESSAGE

410

IN RESPONSE TO RECEIVING THE SECOND CONTROL MESSAGE, FORWARD A SECOND PACKET OF THE FORWARD PACKET FLOW TO THE SECOND NETWORK DEVICE, WHEREIN THE SECOND PACKET INCLUDES THE SECOND METADATA FOR REESTABLISHING THE SESSION

FIG. 4

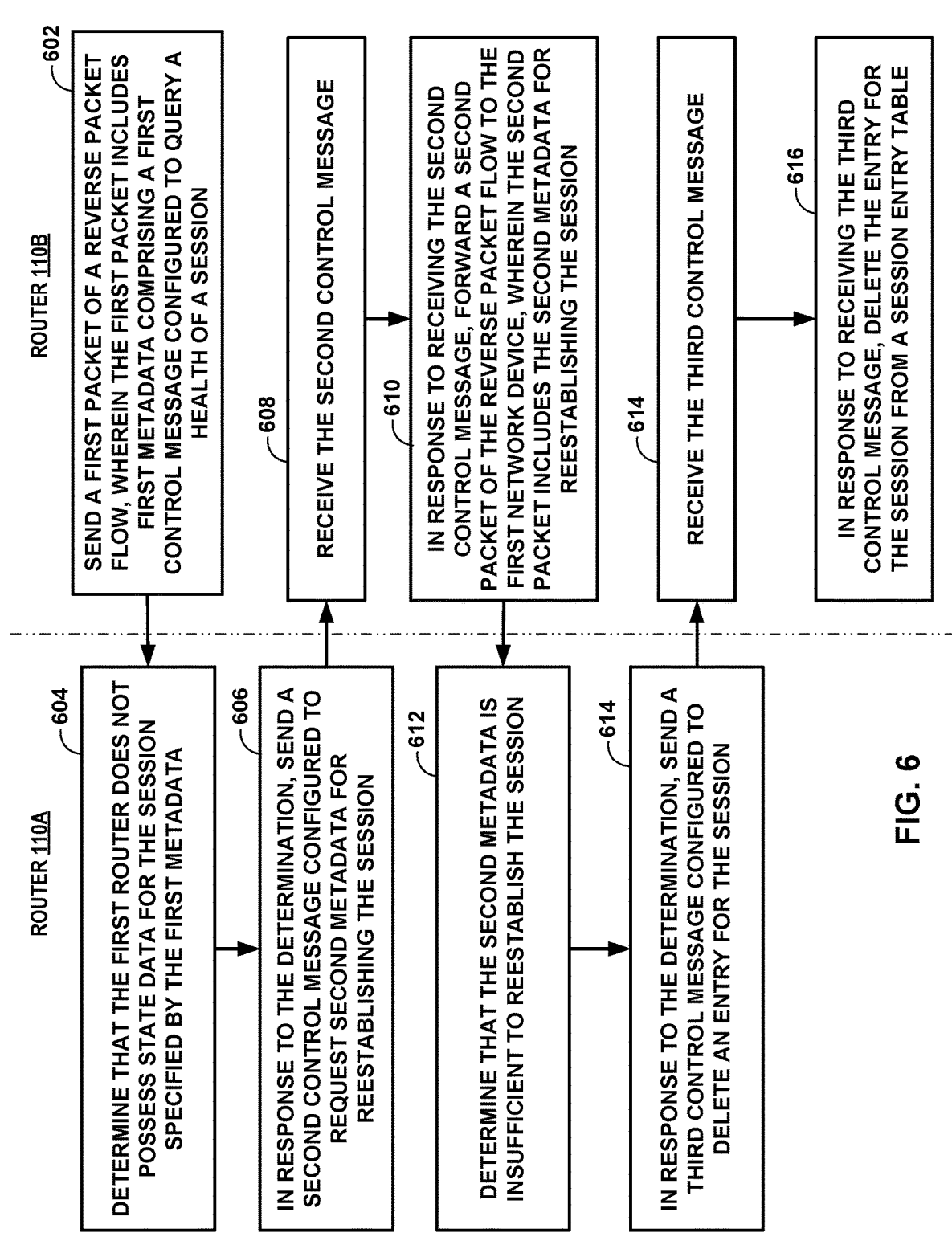

ROUTER 110B — 602

SEND A FIRST PACKET OF A REVERSE PACKET FLOW, WHEREIN THE FIRST PACKET INCLUDES FIRST METADATA COMPRISING A FIRST CONTROL MESSAGE CONFIGURED TO QUERY A HEALTH OF A SESSION

RECEIVE THE SECOND CONTROL MESSAGE — 608

IN RESPONSE TO RECEIVING THE SECOND CONTROL MESSAGE, FORWARD A SECOND PACKET OF THE REVERSE PACKET FLOW TO THE FIRST NETWORK DEVICE, WHEREIN THE SECOND PACKET INCLUDES THE SECOND METADATA FOR REESTABLISHING THE SESSION — 610

RECEIVE THE THIRD CONTROL MESSAGE — 614

IN RESPONSE TO RECEIVING THE THIRD CONTROL MESSAGE, DELETE THE ENTRY FOR THE SESSION FROM A SESSION ENTRY TABLE — 616

ROUTER 110A — 604

DETERMINE THAT THE FIRST ROUTER DOES NOT POSSESS STATE DATA FOR THE SESSION SPECIFIED BY THE FIRST METADATA

IN RESPONSE TO THE DETERMINATION, SEND A SECOND CONTROL MESSAGE CONFIGURED TO REQUEST SECOND METADATA FOR REESTABLISHING THE SESSION — 606

DETERMINE THAT THE SECOND METADATA IS INSUFFICIENT TO REESTABLISH THE SESSION — 612

IN RESPONSE TO THE DETERMINATION, SEND A THIRD CONTROL MESSAGE CONFIGURED TO DELETE AN ENTRY FOR THE SESSION — 614

FIG. 6

MITIGATION OF MISSING SESSION DATA FOR ROUTING SESSION

This application claims the benefit of U.S. Provisional Application No. 63/491,031, which was filed on Mar. 17, 2023, and U.S. Provisional Application No. 63/510,802, which was filed on Jun. 28, 2023, the entire content of each of which is incorporated herein by reference.

TECHNICAL FIELD

This disclosure generally relates to computer networking, and, more specifically, to packet flows within network communications.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. To establish a session, computing devices may use one or more communication session protocols including Transmission Control Protocol (TCP), Transport Layer Security (TLS), User Datagram Protocol (UDP), Internet Control Message Protocol (ICMP), etc. A session may be bidirectional in that the session includes packets traveling in both directions between a first device and a second device. For example, a session includes a forward packet flow originating from a first device and destined for a second device and a reverse packet flow originating from the second device and destined for the first device. The forward and reverse packet flows of the session are related to one another in that the values specified in the source address and source port of the forward packet flow is the same values as specified in the destination address and destination port of the reverse packet flow, and the values specified in the destination address and destination port of the forward packet flow is the same values as specified in the source address and source port of the reverse packet flow.

SUMMARY

In general, the techniques disclosed herein are directed to mitigation of the occurrence of a network device missing state data for a communication session between a first client device and a second client device. In some situations, a network device that performs session-based routing of packets for a session between a first client device and a second client device may lose state data for the session. Upon receiving subsequent packets for the session, the network device may not recognize the incoming packets as belonging to an existing session, and so may be unable to forward the subsequent packets. The loss of state data for the session by the network device may be referred to herein as a "non-responsive session," a "lost session," a "missing session," or a "stuck session." A network device may lose state data for a session for any number of reasons, such as configuration changes, changes in the topology of the network, failure of the network device or a component (e.g., memory, an interface, etc.) of the network device, power loss of the network device, race conditions in the network, etc.

In accordance with the techniques of the disclosure, a messaging scheme is described that enables a first network device and a second network device to communicate loss, by the second network device, of state data for a communication session between a first client device and a second client device and mitigate such loss so as to enable the second network device to recover the session. For example, after establishment of a session comprising a forward packet flow and a reverse packet flow between the first client device and the second client device, the first network device sends, to the second network device, first packets of the forward packet flow of the session. Because the session has previously been established, the first packets typically do not include metadata for the session, such as a session identifier for the session. The second network device may use stored state data for the session to forward the first packets in accordance with session-based routing techniques.

In some situations, the second network device may lose the state data for the session after establishment of the session. In such a situation, the second network device, upon receiving the first packets of the forward packet flow, determines that the first packets do not belong to a recognized session. The second network device may be unable to forward the first packets received from the first network device, and so may drop the first packets. In addition, the second network device may be unable to forward packets of the reverse packet flow to the first network device.

As described herein, upon the first network device determining that the first network device has not received packets of the reverse packet flow of the session from the second network device for a predetermined amount of time, the first network device modifies packets sent to the second network device to include first metadata specifying a first control message configured to query a health of the session. In some examples, the first control message is inserted into the first packets of the forward packet flow as metadata.

Responsive to receiving the first control message, the second network device determines that the second network device does not possess state data for the session specified by the first control message. The second network device sends, to the first network device, a second control message configured to request second metadata for reestablishing the session, such as a session identifier for the session. In some examples, the second control message is generated by the second network device and forwarded to the first network device independently from the packets of the reverse packet flow.

In response to receiving the second control message, the first network device modifies second packets of the forward packet flow to include the second metadata for reestablishing the session, such as a session identifier for the session, and forwards the second packets to the second network device. The second network device may receive the second packets and use the second metadata specified by the second packets to recreate the state data for the session. The second network device may thereby "recover" the session and again forward packets of the forward packet flow and reverse packet flow of the session according to the recovered state data for the session.

The techniques of the disclosure may provide specific improvements to the computer-related field of computer networking that have practical applications. For example, the techniques disclosed herein may enable two network devices to recover a communication session that has failed and otherwise may not be recoverable using existing techniques. Likewise, the techniques disclosed herein may reduce an amount of downtime required to resume communication between the two network devices and may obviate the need to remove an old session and reestablish a new session. Furthermore, the techniques disclosed herein may reduce the occurrence of packets lost or dropped by a network device that has lost state data for a session when performing session-based routing. As another example, the techniques disclosed herein may leverage the forward packet flow and reverse packet flow of a session to detect a loss of state data for the session, as well as to transmit the lost state data to recover the session; this may reduce and in some cases eliminate the need for a separate control or liveness session between the two network devices.

In one example, this disclosure describes a first network device comprising: processing circuitry in communication with storage media, the processing circuitry configured to: send a first packet of a forward packet flow to a second network device, wherein a session comprises the forward packet flow and a reverse packet flow, and wherein the first packet includes first metadata comprising a first control message configured to query a health of the session; receive, from the second control device, a second control message configured to request second metadata for reestablishing the session; in response to receiving the second control message, send a second packet of the forward packet flow to the second network device, wherein the second packet includes the second metadata for reestablishing the session.

In another example, this disclosure describes a first network device configured to receive, from a second network device, a packet of a forward packet flow comprising first metadata comprising a first control message configured to query a health of a session comprising the forward packet flow and a reverse packet flow; determine that the first network device does not possess state data for the session specified by the first control message; in response to determining that the first network device does not include state data for the session, send, to the second network device, a second control message configured to request second metadata for reestablishing the session; receive, from the second network device, a packet including the second metadata for reestablishing the session; and define state data for the session based on the second metadata.

In another example, this disclosure describes a second network device, configured to send a first packet of a reverse packet flow to a first network device, wherein a session comprises a forward packet flow and the reverse packet flow, and wherein the first packet includes first metadata comprising a first control message configured to query a health of the session to the first network device; receive a second control message configured to request second metadata for reestablishing the session from the second network device; in response to receiving the second control message, send a second packet of the reverse packet flow to the first network device, wherein the second packet includes the second metadata for reestablishing the session; receive a third control message configured to cause the second network device to delete an entry for the session from a session entry table of the second network device; and, in response to receiving the third control message, delete the entry for the session from the session entry table of the second network device.

In another example, this disclosure describes a method, comprising: sending, by a first network device, a first packet of a forward packet flow to a second network device, wherein a session comprises the forward packet flow and a reverse packet flow, and wherein the first packet includes first metadata comprising a first control message configured to query a health of the session; receiving, by the first network device and from the second network device, a second control message configured to request second metadata for reestablishing the session; and in response to receiving the second control message, sending, by the first network device, a second packet of the forward packet flow to the second network device, wherein the second packet includes the second metadata for reestablishing the session.

In another example, this disclosure describes a method comprising receiving, from a second network device, a packet of a forward packet flow comprising first metadata comprising a first control message configured to query a health of a session comprising the forward packet flow and a reverse packet flow; determining that the first network device does not possess state data for the session specified by the first control message; in response to determining that the first network device does not include state data for the session, sending, to the second network device, a second control message configured to request second metadata for reestablishing the session; receiving, from the second network device, a packet including the second metadata for reestablishing the session; and defining state data for the session based on the second metadata.

In another example, this disclosure describes a method comprising sending, by a second network device, a first packet of a reverse packet flow to a first network device, wherein a session comprises a forward packet flow and the reverse packet flow, and wherein the first packet includes first metadata comprising does not include metadata for the session; sending, by the second network device, a first control message configured to query a health of the session to the first network device; receiving, by the second network device, a second control message configured to request second metadata for reestablishing the session from the second network device identifier for the session; in response to receiving the second control message, the second network device sending a second packet of the forward packet flow to the first network device, wherein the second packet includes the second metadata for reestablishing the session; receiving, by the second network device, a third control message configured to cause the second network device to delete an entry for the session from a session entry table of the second network device; and, in response to receiving the third control message, the second network device deleting the entry for the session from the session entry table of the second network device.

In another example, this disclosure describes non-transitory, computer-readable storage media comprising instructions that, when executed, cause processing circuitry of a first network device to: send a first packet of a forward packet flow to a second network device, wherein a session comprises the forward packet flow and a reverse packet flow, and wherein the first packet includes first metadata comprising a first control message configured to query a health of the session; receive, from the second network device, a second control message configured to request second metadata for reestablishing the session; and in response to receiving the second control message, send a second packet of the forward packet flow to the second network device, wherein the second packet includes the second metadata for reestablishing the session.

In another example, this disclosure describes a method comprising sending a first packet by a first device to a second device, wherein the first packet does not include metadata, and when a session between the first device and the second device is stuck, dropping the first packet. Packet activity on a reverse flow from the second device to the first device is monitored. When no packet activity is detected for a specified time, the first device sends first metadata to the second device, instructing the second device to perform a session health check. The second device responds to the first metadata by determining whether or not a session exists. When a session does not exist at the second device, the second device sends a control message to the first device, instructing the first device to enable metadata for one or more subsequent packets sent from the first device to the second device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3A is a block diagram illustrating an example data structure for a metadata attribute for a session health check in accordance with the techniques of the disclosure.

FIG. 4 is a flowchart illustrating an example operation in accordance with the techniques of the disclosure.

FIG. 6 is a flowchart illustrating an example operation in accordance with the techniques of the disclosure.

Like reference characters refer to like elements throughout the figures and description.

DETAILED DESCRIPTION

Figure 1:
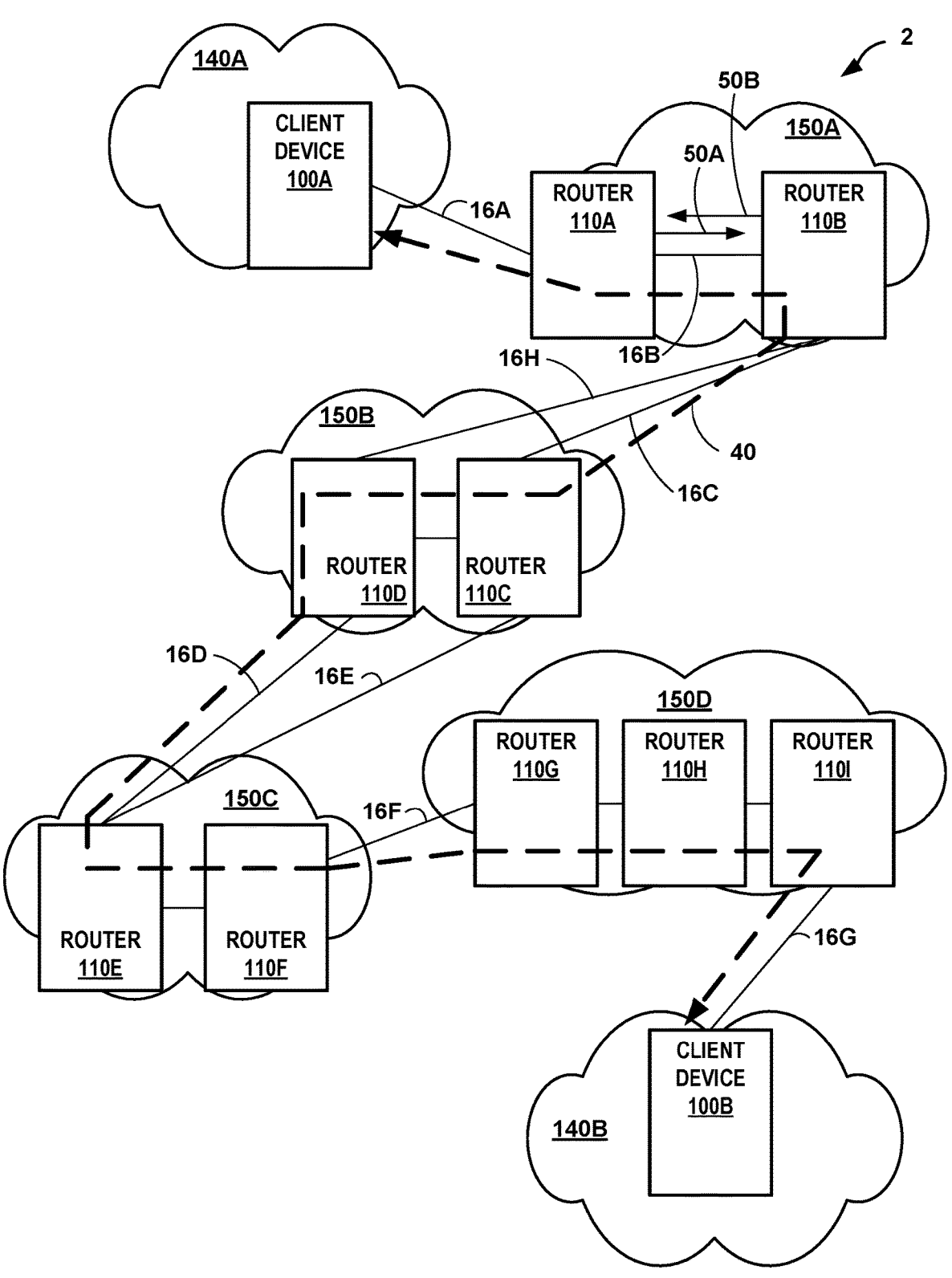
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes one or more service provider networks, e.g., service provider networks 150A-150D (collectively, "service provider networks 150") configured to provide Wide Area Network (WAN) connectivity to disparate customer networks 140A-140B (collectively, "customer networks 140"). Routers 110A-110I (collectively, "routers 110") of service provider networks 150 provide client devices 100A-100B (collectively, "client devices 100") associated with customer networks 140 with access to service provider networks 150. In some examples, customer networks 140 are enterprise networks. Customer network 140A is depicted as having a single client device 100A and customer network 140B is depicted as having a single client device 100B for ease of illustration, but each of customer networks 140 may include any number of client devices.

In some examples, customer networks 140 may be L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices 100, each of which may communicate across service provider networks 150 with one another as described in more detail below. Communication links 16A-16H (collectively, links "16") may be Ethernet, ATM or any other suitable network connections. In other examples, customer networks 140 may be L3 networks. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, routers 110 may implement a stateful, session-based routing scheme that enables each of routers 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc. In some examples, routers 110 include Ethernet over SVR (EoSVR) routers.

In the example of FIG. 1, client device 100A of system 2 establishes session 40 (shown with a dashed line) with client device 100B. Routers 110 facilitate establishment of session 40 by transporting network traffic between client device 100A and client device 100B. In some examples, client device 100A may be considered a "source" device in that client device 100A originates session 40 between client device 100A and client device 100B, e.g., client device 100A is the "source" of a packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, routers 110A-110I, and client device 100B.

In some examples, routers 110 may extend session 40 as an L3 session across service provider networks 150 according to one or more L3 communication session protocols, including Transmission Control Protocol (TCP) or User Datagram Protocol (UDP), etc. For example, to establish session 40 according to TCP such that data may be exchanged according to TCP, client device 100A and client device 100B perform a three-way handshake. Client device 100A sends a first packet comprising a "SYN" flag to client device 100B. Client device 100B acknowledges receipt of the first packet by responding to client device 100A with a second packet comprising a "SYN-ACK" flag. Client device 100A acknowledges receipt of the second packet by responding to client device 100B with a third packet comprising an "ACK" flag. After sending the third packet, session 40 is established according to TCP and client devices 100A, 100B may exchange data with one another via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that client device 100A does not verify that client device 100B is capable of receiving data prior to transmitting data. To establish session 40 according to UDP, client device 100A transmits a first packet to client device 100B. Session 40 may be considered "established" according to UDP upon receipt by client device 100A of any packet from client device 100B, which implies that client device 100B successfully received the first packet from client device 100A, responded, and client device 100A was able to receive the response from client device 100B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for the forward packet flow originating from client device 100A and destined for client device 100B, router 110A determines whether the packet belongs to a new session (e.g., is the "first" packet or "lead" packet of session 40). In some examples, router 110A determines whether session information, e.g., a source address, source port, destination address, destination port, and protocol, of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 100B, and a protocol used by the first packet. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion of the path between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI).

In the example of FIG. 1, a stateful routing session may be established from router 110A (which may be an ingress router) through intermediary network devices, such as routers 110B-110H, to router 110I (which may be an egress router). In this example, router 110A determines that the first packet is an unmodified packet and the first packet of new session 40. Router 110A modifies the first packet to include metadata specifying the session identifier. The metadata may, in some examples, be inserted after the header of the modified first packet. The session identifier may include, e.g., the original source address, source port, destination address, destination port, protocol, service, and/or tenant. Router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 100B. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of addresses or ports indicative that a particular service is associated with session 40.

In some examples, router 110A uses the determined network service for session 40 to select a forward path for forwarding the first packet and each subsequent packet of the forward packet flow of session 40 toward client device 100B. In this fashion, router 110A may perform service-specific path selection to select a network path that best suits the requirements of the service. In contrast to a network topology that uses an SDN controller to perform path selection, each of routers 110 performs path selection. Further, the use of session-based routing enables each of routers 110 to make routing decisions at the service- or application-level, in contrast to conventional routers that are only able to make routing decisions at the flow level.

Additionally, router 110A may store the session identifier for session 40 such that, upon receiving subsequent packets for session 40, router 110A may identify the subsequent packets as belonging to the same session 40 and forward the subsequent packets along the same path as the first packet. In some examples, upon receiving such subsequent packets, router 110A may forward the subsequent packets without the metadata specifying the session identifier.

Intermediary router 110B receives the modified first packet from router 110A. Router 110B determines whether the modified first packet includes metadata specifying the session identifier. In response to determining that the modified first packet includes metadata specifying the session identifier, intermediary router 110B determines that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B may determine that the packet belongs to a new session and create an entry in the session table. Furthermore, if the packet belongs to a new session, router 110B may generate a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router of routers 110 as each of routers 110 forwards the first packet along the forward path. Furthermore, each of routers 110 may store this header information to identify a previous router of routers 110 (or "waypoint") and a next router of routers 110 (or "waypoint") such that each of routers 110 may reconstruct the same forward path and reverse path for each subsequent packet of the session.

Router 110B may replace the header of the modified first packet to specify a source address that is an address of router 110B, a source port that is a port via which router 110B forwards the modified first packet toward client device 100B, a destination address that is an address of the next hop to which router 110B may forward the first packet (e.g., an address of router 110C for session 40 along the first path), and a destination port that is a port of the next hop to which router 110B may forward the first packet (e.g., a port of router 110C). Router 110B forwards the modified first packet to router 110C. Additionally, router 110B may store the session identifier for the session such that, upon receiving subsequent packets for the session, router 110B may identify subsequent packets as belonging to the same session and forward the subsequent packets along the same path as the first packet.

Subsequent intermediary network devices, such as routers 110C-110H, may process the modified first packet in a similar fashion as routers 110A and 110B such that routers 110 forward the subsequent packets of the session along the same path as the first packet. Further, each of routers 110 may store a session identifier for the session, which may include an identification of the previous router of routers 110 along the network path. Thus, each of routers 110 may use the session identifier to forward packets of the reverse packet flow for the session along the same network path back to client device 100A.

A router of routers 110 that may forward packets for a forward packet flow of the session to a destination for the packet flow may be called an egress, or "terminus" router. In the foregoing example, router 110I is a terminus router because router 110I may forward packets to client device 100B. Router 110I receives the modified first packet that comprises the metadata specifying the session identifier (e.g., the original source address, source port, destination address, and destination port). Router 110I determines the modified first packet is destined for a service terminating at router 110I by determining that the destination source address and destination source port specified in the metadata of the modified lead packet corresponds to a destination reachable by router 110I (e.g., client device 100B). Router 110I recovers the original first packet by removing the metadata from the modified first packet and using the metadata to modify the header of the first packet to specify the original source address and source port of client device 100A and destination address and destination port of client device 100B. Router 110I forwards the recovered first packet to client device 100B. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; "Secure Vector Routing (SVR)," draft-menon-svr-00, Internet-Draft, Internet Engineering Task Force (IETF), Oct. 1, 2021, available at https://datatracker.ietf.org/doc/draft-menon-svr/00/; "Secure Vector Routing (SVR)," draft-menon-svr-01, Internet-Draft, Internet Engineering Task Force (IETF), Mar. 29, 2022, available at https://datatracker.ietf.org/doc/draft-menon-svr/01/; "Secure Vector Routing (SVR)," draft-menon-svr-02, Internet-Draft, Internet Engineering Task Force (IETF), Sep. 20, 2022, available at https://datatracker.ietf.org/doc/draft-menon-svr/02/; and "Secure Vector Routing (SVR)," draft-menon-svr-03, Internet-Draft, Internet Engineering Task Force (IETF), Mar. 27, 2023, available at https://datatracker.ietf.org/doc/draft-menon-svr/03/; the entire contents of each of which is incorporated by reference herein.

Bidirectional Forwarding Detection (BFD) is a network protocol that is used to detect faults in a bidirectional path between two network devices, such as link 16B between routers 110A and 110B. BFD provides low-overhead, short-duration detection of failures in the link between the two routers. Further, BFD provides a single mechanism that can be used for liveness detection over any media, at any protocol layer, with a wide range of detection times and overhead, to avoid a proliferation of different methods between adjacent devices. BFD operates on top of any data protocol (network layer, link layer, tunnels, etc.) being forwarded between two network devices. Typically, BFD operates in a unicast, point-to-point mode. BFD packets are carried as a payload of whatever encapsulating protocol is appropriate for the medium and network.

In accordance with BFD, routers 110A and 110B establish a session over link 16B. Typically, routers 110A and 110B establish and tear down a BFD session with a three-way handshake. Typically, routers 110A and 110B may declare link 16B to be operational only after two-way communication is established between routers 110A and 110B. However, this does not preclude the use of unidirectional links. For example, link 16B may represent a first unidirectional link from router 110A to router 11B, and a second unidirectional link from router 110B to router 110A.

Once the BFD session is established, routers 110A and 110B transmit BFD packets periodically over link 16B. Each router 110A, 110B estimates how quickly it may send and receive BFD packets so as to negotiate, with the peer router 110A, 110B how rapidly failure detection may occur. In some examples, routers 110A and 110B may modify, in real-time, these estimates to adapt to network congestion, changes in latency or bandwidth, or other unusual situations. This may allow for the use of a shared medium between fast network devices and slow network devices, while allowing the fast network devices to more rapidly detect failures while allowing the slow network devices to participate in failure detection.

BFD may operate in two modes: asynchronous mode and demand mode. In asynchronous mode, if one of routers 110A and 110B stop receiving BFD packets for some amount of time (the length of which is negotiated as described above), routers 110A and 110B may assume that link 16B (or a component, device, or path forming link 16B) has failed. In demand mode, routers 110A and 110B may negotiate not to send periodic BFD packets in order to reduce overhead. This assumes that routers 110A and 110B have another way to verify connectivity to one another, such as via the physical layer. However, either router 110A, 110B may still send BFD packets if needed.

Additionally, either router 110A, 110B may use an Echo function. When this function is active, router 110A, e.g., sends a stream of Echo packets to router 110B. Router 110B responds by transmitting the Echo packets back to router 110A via the forwarding plane of router 110B. Router 110A may use the Echo function to test the forwarding path to router 110B, and vice versa. Additional example information regarding BFD is described in "Bidirectional Forwarding Detection (BFD)," RFC 5880, IETF, June 2010, available at https://datatracker.ietf.org/doc/html/rfc5880; and "Bidirectional Forwarding Detection (BFD) for IPv4 and IPv6 (Single Hop)," RFC 5881, IETF, June 2010, available at https://datatracker.ietf.org/doc/rfc5881/, the entire contents of each of which are incorporated herein by reference.

Routers 110 create a separate BFD session for each communications path and data protocol in use between two network devices. For example, to perform fault detection along the entire path of session 40 between router 110A and 110I, a distinct BFD session may be established along each link 16, e.g., such as a first BFD session between routers 110A and 110B along a first link, a second BFD session between routers 110B and 110C along link 16C, etc.

In some examples, the use of a dedicated BFD session between two routers may be infeasible. For example, a hub router may be connected to a large number of spoke routers (e.g., dozens, hundreds, or more routers). If such a hub router were to maintain a dedicated BFD session with each spoke router to which the hub router is connected, BFD packets sent and received by the hub router may consume a large amount of network resources. Accordingly, the use of dedicated BFD sessions may consume network resources that could otherwise be used for sending and receiving customer traffic.

In some examples, to reduce the consumption of network resources used for performance monitoring, routers 110 may use in-flow performance monitoring. For example, each router 110 may modify packets carrying customer data for a session between client devices 100 to include metadata comprising performance information. For example, a session between client device 100A and client device 100B comprises a forward flow originating from client device 100A and destined for client device 100B and a reverse flow originating from client device 100B and destined for client device 100A. Router 110A receives, from client device 100A, a first packet of the forward flow, the first packet comprising a header and a data payload. Router 110A modifies the first packet to further include metadata comprising first performance information and forwards the modified first packet to router 110B. Router 110B may obtain the first performance information from the metadata of the first packet. Further, router 110B may remove the metadata and forward the first packet toward client device 100B (e.g., by forwarding the packet to router 110C).

Additionally, router 110B receives, from client device 100B, a second packet of the reverse flow, the second packet comprising a header and a data payload. Router 110B modifies the second packet to further include metadata comprising second performance information and forwards the modified second packet to router 110A. Router 110A may obtain the second performance information from the metadata of the second packet. Further, router 110A may remove the metadata and forward the second packet toward client device 100A.

In some examples, the metadata comprises a BFD packet. In some examples, the metadata comprises a timestamp that routers 110A, 110B may use to determine performance information. In some examples, the metadata comprises a measure of network performance, such as a measure of latency, jitter, packet loss, bandwidth, etc. For example, router 110A modifies a first packet of a forward flow to include metadata specifying a first timestamp indicative of a time at which router 110A forwards the first packet toward router 110B. Router 110B modifies a second packet of a reverse flow to include metadata specifying a second timestamp indicative of a time at which router 110B received the first packet from router 110A and/or a third timestamp indicative of a time at which router 110B forwards the second packet toward router 110A. Router 110A and 110B may exchange a plurality of such modified packets to obtain multiple datapoints regarding the performance of link 16B between router 110A and 110B. Router 110A, for example, may process the multiple timestamps to generate metrics for link 16B between router 110A and 110B, such as latency, jitter, packet loss, bandwidth, etc. In this fashion, routers 110A and 110B may conduct performance monitoring of link 16B without interrupting customer traffic between client devices 100 or consuming additional network resources through the use of dedicated BFD sessions for performance monitoring.

Additional information with respect to performance monitoring is described in U.S. Patent Application Publication No. 2020/0403890, entitled "IN-LINE PERFORMANCE MONITORING," published on Dec. 24, 2020; U.S. Patent Application Publication No. 10,200,264, entitled "LINK STATUS MONITORING BASED ON PACKET LOSS DETECTION," issued on Feb. 5, 2019; and U.S. patent application Ser. No. 17/449,311, filed on Sep. 29, 2021, entitled "OPPORTUNISTIC MESH FOR SOFTWARE-DEFINED WIDE AREA NETWORK (SD-WAN)," the entire content of each of which is incorporated herein by reference in its entirety.

In accordance with the techniques of the disclosure, network devices of computer system 2, such as routers 110, implement a communication scheme for mitigating the occurrence of a network device missing session data for session 40 between client device 100A and client device 100B. As depicted in FIG. 1, a first network device, such as router 110A, is configured to forward packets of a forward packet flow of session 40 to a second network device, such as router 110B. Additionally, router 110B is configured to forward packets of a reverse packet flow of session 40 to router 110A. As described above, router 110A may establish session 40 by modifying a "lead" or initial packet of the forward packet flow of session 40 to include metadata for session 40, and forward the modified packet to router 110B.

After the session is established, routers 110A and 110B may forward subsequent packets of session 40 without such metadata.

In some situations, router 110B, for example, may lose state data for session 40. Upon receiving subsequent packets for session 40 from router 110A, router 110B may not recognize the incoming packets as belonging to an existing session, and so may be unable to forward the subsequent packets received from router 110A along a next hop (e.g., to router 110C). Furthermore, router 110B may be unable to forward packets of the reverse packet flow received from router 110C to router 110A. This loss of state data for the session by router 110B may be referred to herein as a "non-responsive session," a "lost session," a "missing session," or a "stuck session." Routers 110 may lose state data for a session for any number of reasons, such as configuration changes, changes in the topology of the network, failure of the network device or an interface of the network device, power loss of the network device, race conditions in the network, etc.

Because router 110B has lost state data for session 40, router 110B may be unable to forward packets of the reverse packet flow received from router 110C to router 110A. Router 110A determines that router 110A has not received packets of the reverse packet flow of session 40 from router 110B for a predetermined amount of time. In response, router 110A sends, to router 110B, one or more packets including first metadata comprising a first control message 50A configured to query a health of session 40. In some examples, router 110A inserts first control message 50A into the first packets of the forward packet flow as first metadata and forwards to modified first packets to router 110B. In some examples, router 110A generates a control packet including the first control message 50A and forwards the control packet to router 110B independently from the data packets of the forward packet flow of session 40.

Responsive to receiving first control message 50A, router 110B determines that router 110B does not possess state data for the session specified by first control message 50A (e.g., session 40). Router 110B sends, to router 110A, second control message 50B configured to request second metadata for reestablishing session 40, such as a session identifier for session 40. In some examples, router 110B inserts second control message 50B into packets of the reverse packet flow as metadata, and router 110B forwards to modified packets of the reverse packet flow to router 110A.

In some examples, router 110B generates a control packet including second control message 50B and forwards the control packet to router 110A independently from the data packets of the reverse packet flow of session 40. In this example, router 110B uses a source address and port specified by a header of first control message 50A as a destination address and port of the second control message 50B, and further uses a destination address and port specified by the header of first control message 50A as a source address and port of second control message 50B to as to correctly identify the session for which router 110B is requesting metadata.

In response to receiving second control message 50B, router 110B modifies second packets of the forward packet flow to include second metadata for session 40, such as a session identifier for session 40, and forwards the modified second packets to router 110B. Router 110B receives the second packets and use the second metadata specified by the second packets to recreate the state data for session 40. For example, router 110B may use a session identifier for session 40 specified by the second metadata to re-define the entry for session 40 within a session table of router 110B. Additionally, the second metadata may, in some examples, include a cookie or fingerprint for the metadata, a version of a session-based routing protocol used by routers 110, a header length of one or more TL Vs specified by the metadata, or a payload length following the metadata header. Router 110B may thereby "recover" the state data for session 40 and continue to forward packets of the forward packet flow and reverse packet flow of session 40.

Figure 2:
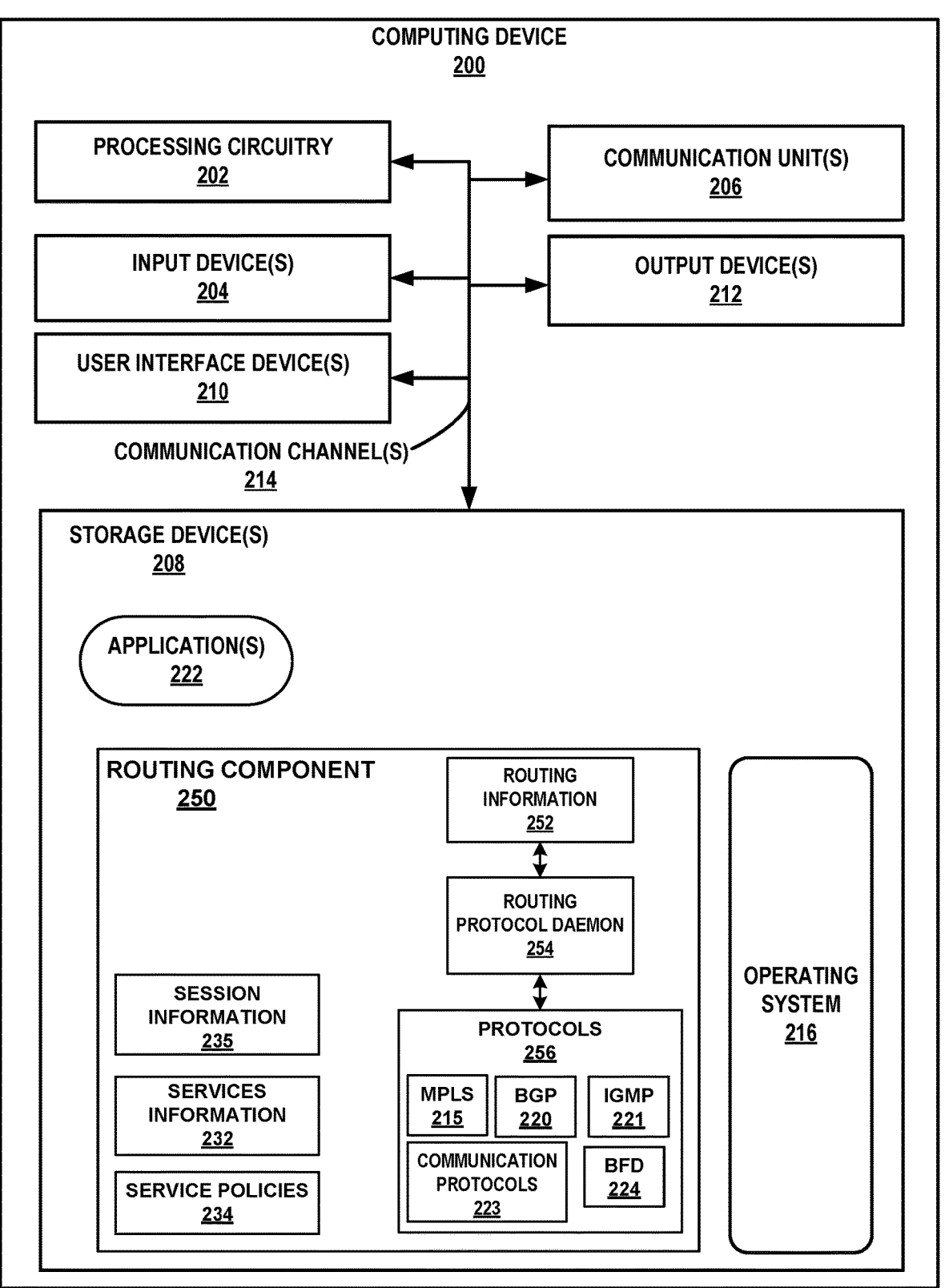
FIG. 2 is a block diagram illustrating an example computing device in accordance with the techniques of the disclosure.

FIG. 2 is a block diagram illustrating an example computing device 200 in accordance with the techniques of the disclosure. In general, computing device 200 may be an example implementation of one of routers 110 of FIG. 1. Computing device 200 includes processing circuitry 202 for executing any one or more of applications 222, routing component 250, or any other computing device described herein. Other examples of computing device 200 may be used in other instances to implement the techniques of the disclosure.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., virtual input and output (VirtIO) and single root input/output virtualization (SR-IOV) network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input device(s) 204, one or more communication unit(s) 206, one or more output device(s) 212, one or more storage device(s) 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channel(s) 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, is configured to implement functionality and/or process instructions for execution within computing device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage device(s) 208 may be configured to store information within computing device 200 during operation. Storage device(s) 208, in some examples, is described as a computer-readable storage medium. In some examples, storage device(s) 208 include a temporary memory, meaning that a primary purpose of storage device 208 is not long-term storage. Storage device(s) 208, in some examples, include a volatile memory, meaning that storage device(s) 208 does not maintain stored contents when the computer is turned off. Examples of volatile memories include random access memories (RAM), dynamic random access memories (DRAM), static random access memories (SRAM), and other forms of volatile memories. In some examples, storage device(s) 208 stores program instructions for execution by processing circuitry 202. Storage device(s) 208, in one example, are used by software or applications running on computing device 200 to temporarily store information during program execution.

Storage device(s) 208, in some examples, also include one or more computer-readable storage media. Storage device(s) 208 may be configured to store larger amounts of information than volatile memory. Storage device(s) 208 may further be configured for long-term storage of information. In some examples, storage device(s) 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication unit(s) 206. Computing device 200, in one example, utilizes communication unit(s) 206 to communicate with external devices via one or more networks, such as one or more wired/wireless/mobile networks. Communication unit(s) 206 may include a network interface, such as an Ethernet card, an optical transceiver, a radio frequency transceiver, or any other type of device that can send and receive information. Other examples of such network interfaces may include 3G/4G/5G and WiFi radios. In some examples, communication unit(s) 206 may include a plurality of high-speed network interface cards. In some examples, computing device 200 uses communication unit(s) 206 to communicate with an external device. For example, computing device 200 uses communication unit(s) 206 to communicate with other routers 110 and/or client devices 100 of FIG. 1 via links 16 of FIG. 1 with which communication unit(s) 206 are connected.

Computing device 200, in one example, also includes one or more user interface device(s) 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing device 200.

One or more output device(s) 212 may also be included in computing device 200. Output device(s) 212, in some examples, is configured to provide output to a user using tactile, audio, or video stimuli. Output device(s) 212, in one example, includes a presence-sensitive display, a sound card, a video graphics adapter card, or any other type of device for converting a signal into an appropriate form understandable to humans or machines. Additional examples of output device(s) 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit(s) 206, storage device(s) 208, input device(s) 204, user interface device(s) 210, and output device(s) 212. Applications 222 may also include program instructions and/or data that are executable by computing device 200.

In some examples, processing circuitry 202 executes routing component 250, which determines routes of received packets and forwards the packets accordingly. Routing component 250 may communicate with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 may execute software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols 223, such as TCP, UDP, TLS, or ICMP. Protocols 256 additionally includes BFD 224.

Routing information 252 may describe a topology of the computer network in which computing device 200 resides, and may also include routes through the shared trees in the computer network. Routing information 252 may describe various routes within the computer network, and the appropriate next hops for each route, e.g., the neighboring routing devices along each of the routes. Routing information 252 may be programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

In some examples, computing device 200 may operate as any of routers 110 of FIG. 1. With reference to FIG. 2, in the following example, computing device 200 operates as router 110A. Computing device 200 receives, via communication unit(s) 206, a packet from client device 100A destined for client device 100B. In response to receiving the packet, computing device 200 generates an L3 packet comprising an L3 header and metadata comprising a source IP address and a source port of client device 100A and a destination IP address and a destination port of client device 100B.

In some examples, the metadata comprises a session identifier. The session identifier is a unique identifier for a session comprising a first packet flow originating from a first client device (e.g., client device 100A) and destined for a second client device (e.g., client device 100B) and a second packet flow originating from the second client device and destined for the first client device. Typically, the session identifier comprises a 5-tuple, e.g., the source IP address and the source port of the first client device, the destination IP address and the destination port of the second client device, and a network protocol used by the session.

In this example, the packet is a first packet of a plurality of packets for the session. In response to receiving the first packet, computing device 200 may generate a session identifier for the session between client device 100A and client device 100B and store the session identifier in session information 235 (e.g., so as to store the metadata of the L3 packet). Computing device 200 may generate, based on the first packet, the L3 packet comprising the L3 header and the metadata, as described above. Computing device 200 forwards, via communication unit(s) 206, the L3 packet toward the next-hop router, router 110B.

For subsequent packets, computing device 200 may determine, based on information of the subsequent packets (e.g., 5-tuple), that the subsequent packets belong to the same session as the first packet. For example, in response to receiving a second packet for the session, computing device 200 may perform a lookup of session information 235 and determine, based on the source address, source port, destination address, destination port, and/or protocol specified by the second packet, that the second packet belongs to a session having a corresponding entry within session information 235.

In response to determining that the subsequent packets belong to the same session as the first packet, computing device 200 may generate, for the subsequent packets, subsequent L3 packets that include the L3 header but do not include the metadata (as the session identifier associated with a given session is already stored by, e.g., each subsequent router receiving the first packet).

Computing device 200 may forward the subsequent L3 packets toward the same next-hop router 110B. Intermediary network devices (e.g., routers 110B-110H) may receive the subsequent L3 packets and identify, from the L3 header of the subsequent L3 packets, the session associated with the subsequent L3 packets, and use the stored metadata to perform session-based routing of the subsequent L3 packets. In this fashion, computing device 200 may only modify the first L3 packet of the plurality of L3 packets generated for the session to include the metadata, thereby avoiding including the metadata within every packet of the plurality of L3 packets generated for the session while still ensuring that each L3 packet of the plurality of L3 packets is forwarded along the same path (e.g., to the same next-hop router 110) and that the original packet may be recovered from the L3 packet by an egress router, such as router 110I.

With reference to FIG. 2, in the following example, computing device 200 operates as router 110I and receives an L3 packet modified as described above from router 110H. For example, computing device 200 receives, via communication unit(s) 206, the L3 packet comprising the L3 header and the metadata.

If the L3 packet is a first L3 packet of a plurality of L3 packets for the session, computing device 200 may use the metadata to generate a session identifier for the session between client device 100A and client device 100B and store the session identifier in session information 235 (e.g., so as to store the metadata of the L3 packet). In response to determining the packet is destined for a client device coupled to router 110I, computing device 200 may use the metadata of the L3 packet to recover the original packet. For example, computing device 200 may use the metadata to modify the header of the packet to specify the original source address, source port, destination address, and destination port. Computing device 200 then forwards the recovered packet to client device 100B.

Computing device 200 may further receive subsequent L3 packets of the plurality of L3 packets that do not include the metadata. For these subsequent L3 packets, computing device 200 may determine, based on the L3 header (e.g., the source IP address and source port of a previous-hop router and the destination IP address and destination port of router 110I), that the subsequent L3 packets belong to the same session as the first L3 packet. Computing device 200 may determine the original destination port and destination address of the packet from the stored metadata for the first L3 packet. Computing device 200 may forward, via communication unit(s) 206, the subsequent packets to client device 100A. In this fashion, computing device 200 may receive only a first L3 packet that specifies the metadata, while subsequent L3 packets do not include such information. Thereby, routers 110 as described herein may avoid including the metadata within every packet of the plurality of L3 packets generated for the session while still ensuring that each L3 packet of the plurality of L3 packets is forwarded along the same path (e.g., to the same next-hop router 110).

In accordance with the techniques of the disclosure, computing device 200 operates to mitigate an occurrence wherein egress router 110B of FIG. 1 is missing session data for session 40 between client device 100A and client device 100B of FIG. 1. In the following example, computing device 200 operates as ingress router 110A of FIG. 1, however, computing device 200 may represent any of routers 110 (FIG. 1). In this example, egress router 110B loses state data for session 40, and is unable to forward packets associated with session 40.

Communication unit(s) 206 of computing device 200 is configured to send packets of a forward packet flow of session 40 to a second network device, such router 110B of FIG. 1, and receive packets of a reverse packet flow of session 40 from router 110B. Typically, after session 40 is established, computing device 200 and router 110B exchange packets of session 40 that do not include metadata for session 40.

Computing device 200 may determine that a problem has occurred with router 110B in response to determining that computing device 200 has not received packets of the reverse packet flow of session 40 from router 110B for a predetermined amount of time. In response to such a determination, communication unit(s) 206 send one or more packets including first metadata comprising a first control message configured to query a health of session 40 to router 110B. Information for session 40 may be stored in session information 235 of routing component 250. After sending the first metadata, communication unit(s) 206 receive a second control message configured to request a second metadata for session 40 from router 110B. In response to receiving the second control message, communication unit(s) 206 send a second packet of the forward packet flow to router 110B, wherein the second packet includes second metadata for session 40.

In some examples, the second metadata comprises a session identifier for the session, with the session identifier being stored in session information 235 of routing component 250. In some examples, the session identifier in session information 235 is a 5-tuple comprising a source address and a source port for a first client device, a destination address and a destination port for a second client device, and a network protocol. In some examples, computing device 200 comprises an ingress router, such as router 110A of service provider network 150A and router 110B comprises an egress router of service provider network 150A.

In some examples, the first control message configured to query the health of the session comprises a type-length-value (TLV) message that includes a message type, a message length, and a message value, wherein the message value specifies at least one of a session health check request or a session timeout request. In some examples, communication unit(s) 206 of computing device 200 is configured to send the first control message in response to determining that the first network device has not received a packet of the reverse packet flow of the session from the second network device for a predetermined amount of time.

In another example of techniques of the disclosure, computing device 200 operates as egress router 110B of FIG. 1, however, computing device 200 may represent any of routers 110 (FIG. 1). In this example, computing device 200 has lost state data for session 40. Further, ingress router 110A of FIG. 1 operates to mitigate of the occurrence of computing device 200 missing session data for session 40.

Computing device 200 receives, from, e.g., router 110A of FIG. 1, one or more packets including first metadata comprising a first control message configured to query a health of session 40 comprising a forward packet flow and a reverse packet flow. Processing circuitry 202 of computing device 200 determines that session information 235 does not possess state data for session 40 specified by the first control message. For example, processing circuitry 202 may determine that a session state table implemented by session information 235 does not include an entry corresponding to the session specified by the first control message. In response to determining that computing device 200 does not include state data for session 40, communication unit(s) 206 of the first network device send, to router 110A, a second control message configured to request second metadata for reestablishing session 40. The communication unit(s) 206 of the first network device receive, from router 110A, a subsequent packet of the forward packet flow of session 40, the subsequent packet including second metadata for reestablishing session 40. Processing circuitry 202 defines state data for session 40 based at least in part on the second metadata in session information 235.

In some examples, storage device(s) 208 of the first network device is configured to store the second metadata for the session. In some examples, the second metadata comprises a session identifier for the session stored in session information 235, wherein the session identifier is a 5-tuple comprising a source address and a source port for a first client device, a destination address and a destination port for a second client device, and a network protocol. In some examples, computing device 200 is configured to: prior to receiving the packet including the second metadata for session 40, receive, from router 110A, a second packet for session 40 that does not include second metadata for session 40. Processing circuitry 202 of computing device 200 determines that session information 235 of computing device 200 does not possess state data for session 40, and instructs routing component 250 to drop the second packet in response to determining that the computing device 200 does not include state data for session 40. In some examples, to determine that computing device 200 does not possess state data for session 40, routing component 250 of computing device 200 is configured to determine that a session table in session information 235 of computing device 200 does not include an entry for the session specified by the first control message.

In another example of the techniques of the disclosure, computing device 200 operates as egress router 110B of FIG. 1, however, computing device 200 may represent any of routers 110 (FIG. 1). In this example, ingress router 110A loses state data for session 40, and is unable to forward packets associated with session 40. In the following example, computing device 200 operates to mitigate of the occurrence of router 110A that is missing session data for session 40.

Communication unit(s) 206 of computing device 200 are configured to send a first packet of a reverse packet flow of session 40 to router 110A. Typically, after session 4 has been established, the packets exchanged between router 110A and computing device 200 do not include metadata for session 40.

Computing device 200 may determine that a problem has occurred with router 110A in response to determining that computing device 200 has not received packets of the forward packet flow of session 40 from router 110A for a predetermined amount of time. In response to such a determination, communication unit(s) 206 of computing device 200 send one or more packets including first metadata comprising a first control message configured to query a health of session 40 to router 110A. Communication unit(s) 206 of computing device 200 receive a second control message configured to request second metadata for reestablishing session 40 from session information 235 of computing device 200. In response to receiving the second control message, communication unit(s) 206 of computing device 200 send a second packet of the reverse packet flow to router 110A, wherein the second packet includes the second metadata for session 40. However, in circumstances where an ingress router of service provider network 150, such as ingress router 110A, loses state data for session 40, router 110A may be unable to recover the session. Therefore, ingress router 110A may cause computing device 200 to delete its session information for session 40, rather than attempting to recover session 40.

For example, communication unit(s) 206 of computing device 200 receives a third control message configured to cause computing device 200 to remove state data for session 40 from session information 235. For example, in response to receiving the third control message, processing circuitry 202 deletes an entry for session 40 from a session entry table of session information 235 of computing device 200.

Subsequently, communication unit(s) 206 of computing device 200 receive, from client device 100B, a second packet of the reverse packet flow of session 40. Because computing device 200 has deleted the state data for session 40 from session information 235, computing device 200 interprets the second packet of the reverse packet flow of session 40 as a first packet of a forward packet flow of a new session. Therefore, computing device 200 defines new state data for the new session, and forwards this packet to router 110A. It may be seen, therefore, that for session 40, router 110A operated as an ingress network device and computing device 200 operated as an egress network device. However, upon defining the new session, the roles of router 110A and computing device 200 reverse, such that computing device 200 operates as the ingress network device and router 110A operates as the egress network device for the new session.

In some examples, the second metadata in session information 235 comprises the session identifier. In some examples, the session identifier is a 5-tuple comprising a source address and a source port for client device 100A of FIG. 1, a destination address and a destination port for client device 100B of FIG. 1, and a network protocol used by client devices 100A and 100B. In some examples, the second control message comprises a type-length-value (TLV) message that includes a message type, a message length, and a message value, and the message value specifies at least one of enabling metadata, deleting a session, or performing a session health check. In some examples, router 110A operates as an ingress router and computing device 200 operates as an egress router for service provider network 150A. Computing device 200, operating as egress router 110B of FIG. 1, includes state data for session 40 in its session information 235 enabling computing device 200 to forward packets of the reverse packet flow of session 40 to router 110A, and wherein ingress router 110A does not include state data for session 40 and so is unable to forward packets of the forward packet flow of session 40 to computing device 200.

In some examples, the forward packet flow of the session comprises a forward packet flow originating from client device 100A and destined for client device 100B, wherein the reverse packet flow of the session comprises a reverse packet flow originating from client device 100B and destined for client device 100A, and wherein computing device 200 is further configured to: after deleting the entry for session 40 from the session entry table in session information 235, receive a second packet of the reverse packet flow from client device 100B; and define a second entry in the session entry table in session information 235 for a second session in response to receiving the second packet. In some examples, the first control message configured to query the health of the session comprises a type-length-value (TLV) message that includes a message type, a message length, and a message value, wherein the message value specifies at least one of a session health check request or a session timeout request. In some examples, at least one of the second control message or the third control message comprises a type-length-value (TLV) message that includes a message type, a message length, and a message value, and the message value specifies at least one of enabling metadata, deleting a session, or performing a session health check. In some examples, communication unit(s) 206 of the second network device send the first control message. Processing circuitry 202 instructs routing component 250 to modify a second packet of the reverse packet flow to include metadata comprising the first control message. Processing circuitry 202 instructs communication unit(s) 206 to forward the modified second packet to the first network device.

In some examples, to send the first control message, processing circuitry 202 of second network device is configured to generate a packet including the first control message; and forward the packet including the first control message over communication unit(s) 206 to the first network device. In some examples, processing circuitry 202 of second network device is configured to instruct routing component 250 to drop the second control message without forwarding the second control message.

FIG. 3A is a block diagram illustrating an example data structure 350 for a metadata attribute for a session health check message in accordance with the techniques of the disclosure. Data structure 350 includes a type field, a length field, and a value field, which indicates a type of session health check message as described herein. In the example of FIG. 3A, the type field specifies a value of '46' and the length field specifies a value of '1'. The value field indicates a type of session health check message and may specify, e.g., a value of '1,' indicating a 'request' type, or a value of '2,' indicating a 'request-timeout' type, in the example shown.

Figure 3B:
FIG. 3B is a block diagram illustrating an example data structure for a metadata attribute for a forced drop in accordance with the techniques of the disclosure.

FIG. 3B is a block diagram illustrating an example data structure 360 for a metadata attribute for a forced drop message in accordance with the techniques of the disclosure. Data structure 360 includes a type field, a length field, and a value field, which includes a value for a forced drop message as described herein. In the example of FIG. 3A, the type field specifies a value of '24' and the length field specifies a value of '1'. The value field indicates a reason for a forced drop and may specify, e.g., a value of '2,' indicating the recipient router 110 is to enable metadata in subsequent packets for the session, a value of '6', indicating that the recipient router 110 is to delete an entry for the session, or a value of '8,' indicating a session health check is requested, in the example shown.

Upon inactivity detection, "session-health-check" metadata attribute is appended to packet destined towards the peer. If the peer session is valid, but the traffic in the opposite direction is not present the peer will respond with a generated packet that indicates a response to session-health-check ("forced-drop", reason 8). If the peer session is missing, the peer will respond with a generated packet that indicates to enable metadata ("forced-drop", reason 2). The activity is monitored for both forward and reverse flows, and if forward flow is deemed to be idle, the "session-health-check" attribute will be generated for the reverse traffic as well.

When metadata is enabled, the next packet with metadata will be used to set up a new session on the peer device. The directionality of the session now becomes important. If the session is missing on the egress router, enabling forward metadata on the ingress router will re-establish the session. If the session is missing on the ingress router, and only the reverse traffic is active, reverse packet with metadata will not re-establish this session. Another response packet ("forced-drop", reason 6) will be generated back, with the indication to the originator to delete the session. Once the session is removed, the next packet from the LAN on the originating node will actually create a new session, now established in the opposite direction.

If there is no response at all coming back from the peer, it may indicate that some man-in-the-middle device closed the pinhole. In this case, there are some possible scenarios: In a topology, where the session is originated on the hub with the spoke's "peer-connectivity" marked as "outbound-only", and the reverse traffic is not present, the forward flow on the hub will be invalidated, and the SSR will attempt to re-establish the session over BFD pinhole. In a topology where the hub is running with 2 redundant nodes and the session is going over the dog-leg and the reverse traffic is not present, the first node will not invalidate the forward flow. It will send the "Type=2" (Request-Timeout) in the "session-health-check" attribute. Once the packet is received by the second node on the hub, it will then invalidate the forward flow in order to force it to re-establish over the BFD pinhole.

If the session was originated on the spoke, it may actually be the reverse traffic that is stuck if the pinhole was closed by the "man-in-the-middle". In this case, if only reverse traffic is present, and enabling metadata didn't help, the reverse packet cannot be used to re-establish the session over pinhole. In this case, the session will be deleted. By removing the session on this node, the subsequent packet from the LAN should be able to re-establish the session in the forward direction, by properly using the BFD pinhole.

Configuration, Data Model and Interfaces

A new data model is added to configuration to enable this feature. An example configuration is depicted below:

Default configuration:
    "authority-config: authority": {
        "session-recovery-detection": {
            "mode": "packet-based"
        }
    New mode:
    "authority-config: authority": {
        "session-recovery-detection": {
            "mode": "inactivity-based",
            "inactivity-timeout": 5
        }

The "inactivity-timeout" is a value in seconds and is defaulted, e.g, to 5 seconds. Since this entire mechanism uses metadata request/response mechanism, all session smart routers (SSRs), such as routers 110 of FIG. 1, may be upgraded to understand the new attributes. Additional description with respect to session-smart routers and session-based routing is set forth in U.S. Pat. No. 9,762,485, entitled "NETWORK PACKET FLOW CONTROLLER WITH EXTENDED SESSION MANAGEMENT," issued on Sep. 12, 2017; U.S. Pat. No. 10,277,506, entitled "STATEFUL LOAD BALANCING IN A STATELESS NETWORK," issued on Apr. 30, 2019; and U.S. Pat. No. 9,729,439, entitled "NETWORK PACKET FLOW CON- TROLLER," issued on Aug. 8, 2017, the entire contents of each of which are incorporated by reference herein.

Failure Scenarios and Recovery: There are multiple failure scenarios that may cause a session to be stuck or missing on one of the nodes (e.g., one of routers 110 of FIG. 1). Enabling of metadata is a recovery mechanism built into the SSR to avoid a session being stuck permanently. While it doesn't solve every network glitch, it preserves this functionality. Automatic stuck session recovery relies on this mechanism as stuck sessions can only be removed if metadata is enabled.

Troubleshooting: A number of metrics are defined to indicate different kinds of failure modes.

Constraints: Packet-based stuck session detection reacts to any packet without metadata and responds with an indication to enable it. While it causes the security scans to be unhappy, the detection is instantaneous and ensures minimal packet loss. Enabling "inactivity-based" detection can incur more packet loss, as it will take several seconds for inactivity to be detected before metadata is actually enabled. This mode is less reactive than packet-based mode. It will also add occasional byte overhead for sessions that are mostly idle. Enabling "inactivity-based" detection mode if not every SSR has been upgraded can cause more stuck sessions, as some SSRs will not be able to participate in the activity detection mechanism.

The automatic detection of stuck sessions is an on-going effort with continuous improvements being made as new failure modes are discovered/understood. In some examples, the techniques of the disclosure may be implemented for deployment within a Network Management System (NMS). Additional information describing an NMS may be found within U.S. Pat. No. 10,958,585, entitled "METHODS AND APPARATUS FOR FACILITATING FAULT DETECTION AND/OR PREDICTIVE FAULT DETECTION," issued on Mar. 23, 2021; U.S. Pat. No. 9,832,082, entitled "MONITORING WIRELESS ACCESS POINT EVENTS," issued on Nov. 28, 2017; U.S. Pat. No. 10,958,537, entitled "METHOD FOR SPATIO-TEMPORAL MONITORING," issued on Mar. 23, 2021; and U.S. Pat. No. 10,985,969, entitled "SYSTEMS AND METHODS FOR A VIRTUAL NETWORK ASSISTANT," issued on Apr. 20, 2021, the entire contents of each of which are incorporated by reference herein.

Figure 3C:
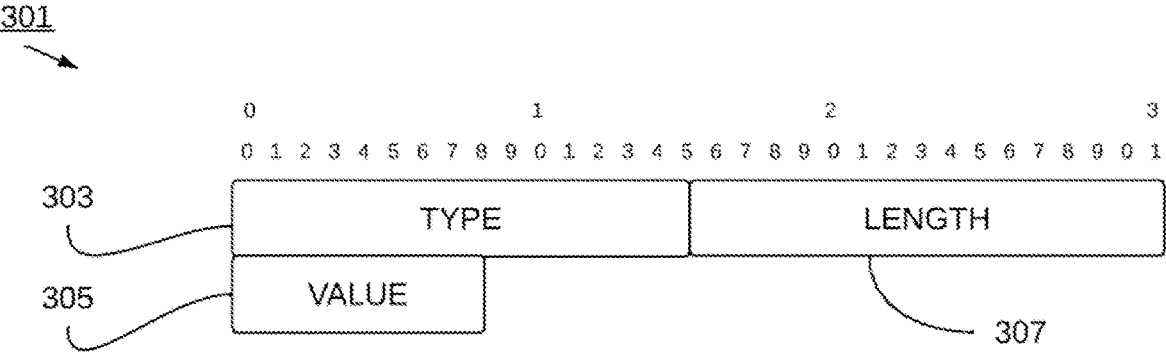
FIG. 3C is a block diagram illustrating a first example data structure for a type-length-value (TLV) message in accordance with the techniques of the disclosure.

FIG. 3C is a block diagram illustrating a first example data structure for a type-length-value (TLV) metadata attribute 301 in accordance with the techniques of the disclosure. TLV metadata attribute 301 specifies a session health check metadata attribute for, e.g., session 40 between, e.g., routers 110A and 110B of FIG. 1. Metadata attribute 301 includes type field 303, length field 307, and session health check value field 305. In an example implementation, type field 303 is a 16-bit field that specifies a value of '46' and length field 307 is 16-bit field that specifies a value of '1.' Session health check value field 305 specifies a type of a session health check for session 40. For example, with respect to the foregoing example implementation, session health check value field 305 is an 8-bit field that may specify a value of '1,' indicating a 'request' value, or a value of '2,' indicating a 'request-timeout' value, in the example shown.

Figure 3D:
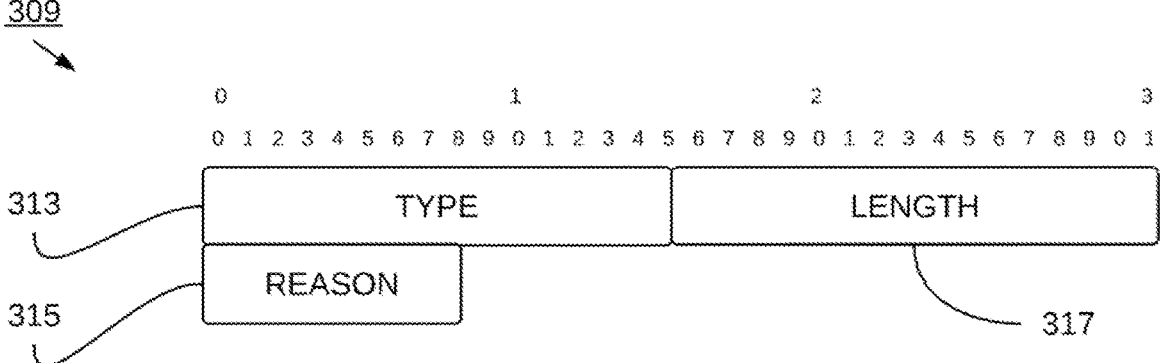
FIG. 3D is a block diagram illustrating a second example data structure for a type-length-value (TLV) message in accordance with the techniques of the disclosure.

FIG. 3D is a block diagram illustrating a second example data structure for a TLV metadata attribute 309 in accordance with the techniques of the disclosure. TLV metadata attribute 309 specifies a forced drop metadata attribute for, e.g., session 40 between routers 110A and 110B of FIG. 1. Metadata attribute 309 includes type field 313, length field 317, and forced drop reason value field 315. In an example implementation, type field 313 is a 16-bit field that specifies a value of '24' and length field 317 is a 16-bit field that specifies a value of '1.' Forced drop reason value field 315 specifies a reason for a forced drop of session 40. For example, with respect to the foregoing example implementation, forced drop reason value field 315 is an 8-bit field that may specify a value of '2,' indicating the recipient router 110 is to enable metadata in subsequent packets for the session, a value of '6', indicating that the recipient router 110 is to delete an entry for the session, or a value of '8,' indicating a session health check is requested, in the example shown.

Upon inactivity detection, TLV message 301 for the session health check attribute is appended to packet data destined towards a peer (such as one of routers 110 of FIG. 1). If a peer session is valid, but traffic in an opposite direction is not present, the peer will respond with a generated packet including the TLV message 309 for the forced drop attribute. In this case, the TLV message 309 indicates a response to session health check (forced drop reason=8). If the peer session is missing, the peer will respond with a generated packet including the TLV message 309 for the forced drop attribute. In this case, the TLV message 309 indicates to enable metadata (forced drop reason=2). Activity can be monitored for both forward and reverse flows. If forward flow is determined to be idle, the TLV message 301 for the session health check attribute will generated for reverse traffic as well.

FIG. 4 is a flow diagram illustrating an example operation in accordance with the techniques of the disclosure. FIG. 4 is described with respect to FIG. 1 for convenience. As depicted in the example of FIG. 4, router 110A of FIG. 1 sends a first packet of a forward packet flow of session 40 to router 110B. Session 40 comprises the forward packet flow and a reverse packet flow. Typically, because session 40 has already been established for some period of time, the first packet does not include metadata for session 40.

In this example, router 110B has lost state data for session 40 and is unable to forward packets of the reverse packet flow of session 40 to router 110A. Router 110A of FIG. 1 sends one or more packets including first metadata comprising a first control message configured to query a health of session 40 to router 110B (402). For example, router 110A sends the first control message configured to query the health of session 40 in response to determining that router 110A has not received a packet of the reverse packet flow of session 40 from router 110B for a predetermined amount of time.

Router 110B receives the first control message configured to query the health of session 40. Router 110B determines that router 110B does not possess state data for the session specified the first control message (e.g., session 40) (404). In response to the determination, router 110B sends a second control message configured to request second metadata for reestablishing session 40 (406). Router 110A receives the second control message (408). In response to receiving the second control message, router 110A forwards a second packet of the forward packet flow of session 40 to router 110B, wherein the second packet includes the second metadata for the session (410). Router 110B defines state data for session 40 based at least in part on the received second metadata (412).

Figure 5A:
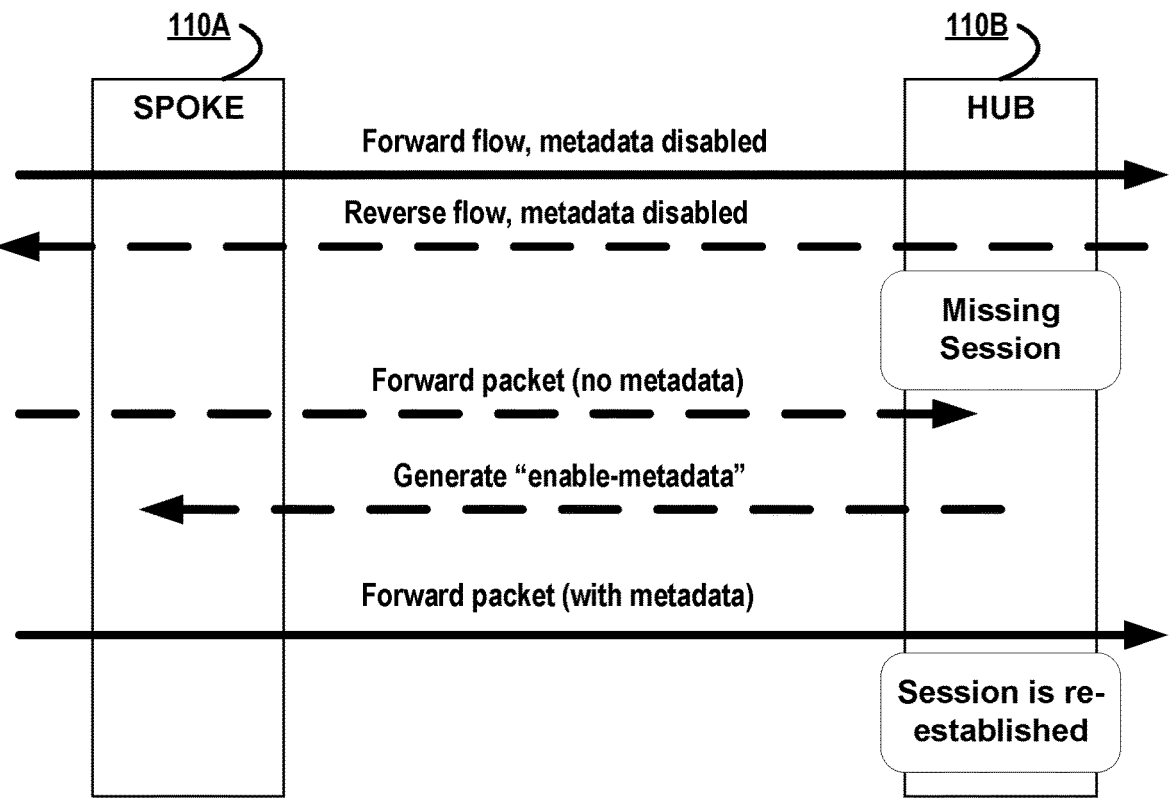
FIG. 5A is a flow diagram illustrating an example operation in accordance with the techniques of the disclosure

FIG. 5A is a flow diagram illustrating an example operation in accordance with the techniques of the disclosure. FIG. 5A is described with respect to FIG. 1 for convenience. As depicted in the example of FIG. 5A, router 110A forwards, to router 110B, packets of a forward packet flow of session 40 with metadata disabled. Further, router 110B forwards, to router 110A, packets of a reverse packet flow of session 40 with metadata disabled.

Whenever a packet comes in destined for an IP/port pair configured for SVR, if there is no existing associated flow, any request without metadata is treated by the SSR as a stuck session. The stuck session mitigation feature generates a response packet with special metadata fields which tell the generating device to enable its metadata, which in turn will allow the session to be recovered. Port scans and security scans sometimes fail due to the SSR generating a response to some of the ports used for SVR. This functional spec describes how to enable an inactivity-based detection mode to prevent this response generation by the SSR.

For example, router 110B receives a packet of the forward packet flow and determines that router 110B does not possess state data for session 40. In response to the determination, router 110B sends a control message requesting router 110A enable metadata on subsequent packets of the forward packet flow of session 40. In response to receiving the control message, router 110A forwards, to router 110B, packets of the forward packet flow of session 40 with metadata enabled. Router 110B reestablishes session 40 based at least in part on the received metadata.

Something happened on the hub and the hub's session no longer exists. The spoke will continue to send packets towards the hub, but the hub cannot process them, unless a session exists. When a packet without metadata hits the hub, a message is generated by the hub with an indication to the spoke to enable metadata. This is the message that is flagged by some security scans, creating a false-positive that the SSR is actively listening on SVR ports. This metadata response is also a means of fingerprinting the SSR, which may increase the overall security risk level of deployment in certain networks. The packet that comes without metadata cannot be authenticated or validated against a particular peer, thus the SSR blindly responds in an attempt to recover this session.

Figure 5B:
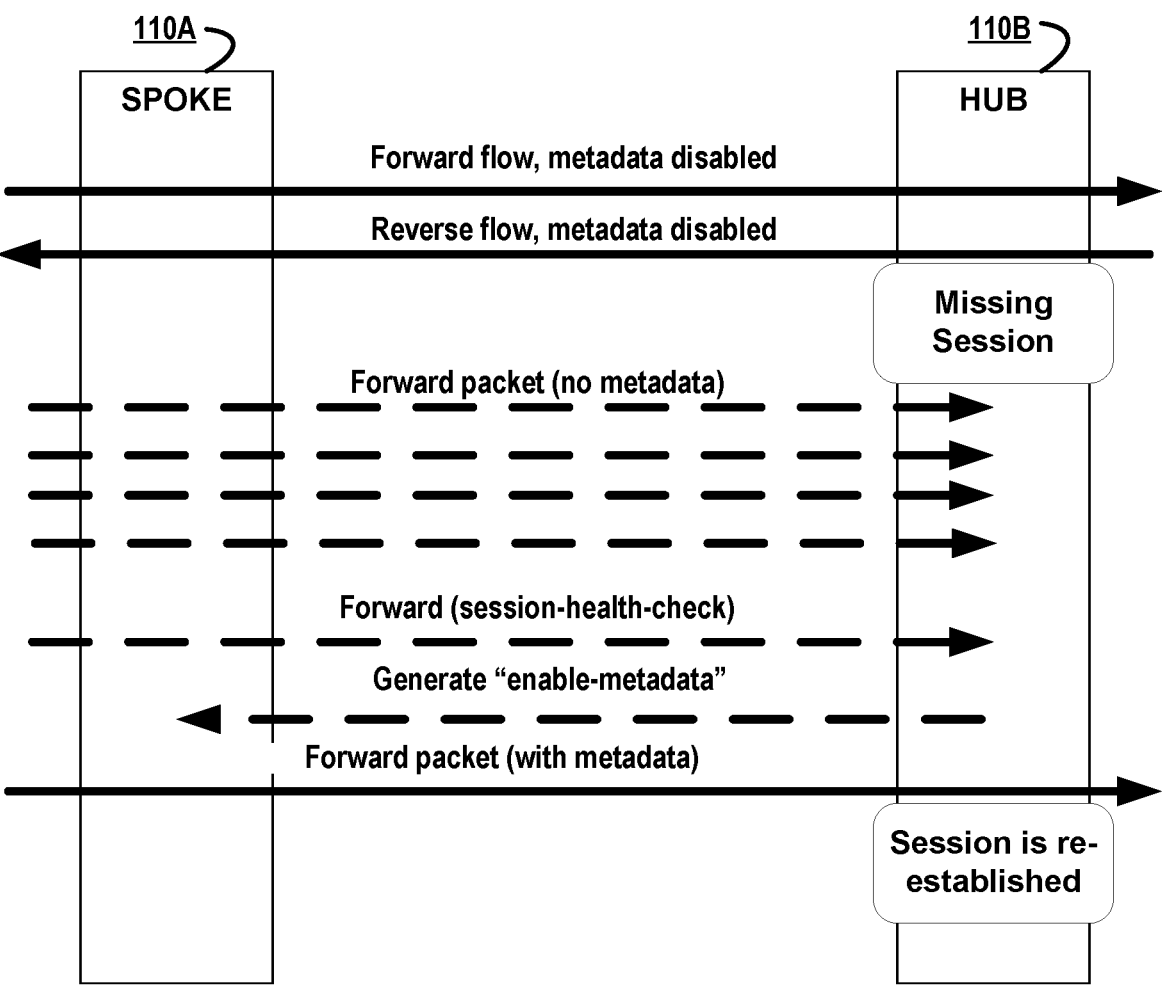
FIG. 5B is a flow diagram illustrating an example operation in accordance with the techniques of the disclosure

FIG. 5B is a flow diagram illustrating an example operation in accordance with the techniques of the disclosure. FIG. 5B is described with respect to FIG. 1 for convenience. As depicted in the example of FIG. 5B, router 110A forwards, to router 110B, packets of a forward packet flow of session 40 with metadata disabled. Further, router 110B forwards, to router 110A, packets of a reverse packet flow of session 40 with metadata disabled.

When the new "inactivity-based" detection mode is enabled, the SSR will implement a different detection mechanism for enabling metadata when a session is missing. When inactivity-based detection mode is enabled, the first packet to miss the flow on the hub and not have metadata will be dropped. The originating node (Spoke in the FIG. 5B) will monitor activity on the reverse flow, and if no activity is detected for specified time, it will add an additional metadata attribute called "session-health-check". The session-health check attribute will be validated by the receiving node (in this case the hub) and if the flow on the hub does not exist, the hub can safely generate an enable-metadata message back to the spoke.

For example, router 110B receives a packet of the forward packet flow and determines that router 110B does not possess state data for session 40. In response to the determination, router 110B drops the packets. Furthermore, router 110B is unable to forward packets of the reverse packet flow of session 40 to router 110A. In response to determining that router 110A has not received packets of the reverse packet flow of session 40 from router 110B for a predetermined amount of time, router 110A sends, to router

110B, one or more packets including first metadata comprising a first control message configured to request a session health check of session 40. In response to receiving the first control message, router 110B sends, to router 110A, a second control message requesting router 110A enable metadata on subsequent packets of the forward packet flow of session 40. In response to receiving the second control message, router 110A forwards, to router 110B, packets of the forward packet flow of session 40 with metadata enabled. Router 110B reestablishes session 40 based at least in part on the received metadata.

FIG. 6 is a flow diagram illustrating an example operation in accordance with the techniques of the disclosure. FIG. 6 is described with respect to FIG. 1 for convenience. As depicted in the example of FIG. 6, router 110B of FIG. 1 sends a first packet of a reverse packet flow of session 40 to router 110A. Session 40 comprises the reverse packet flow and a forward packet flow. Typically, because session 40 has already been established for some period of time, the first packet does not include metadata for session 40.

In this example, router 110A has lost state data for session 40 and is unable to forward packets of the forward packet flow of session 40 to router 110B. Router 110B of FIG. 1 sends one or more packets including first metadata comprising a first control message configured to query a health of session 40 to router 110A (602). For example, router 110B sends the first control message configured to query the health of session 40 in response to determining that router 110B has not received a packet of the forward packet flow of session 40 from router 110A for a predetermined amount of time.

Router 110A receives the first control message configured to query the health of session 40. Router 110A determines that router 110A does not possess state data for the session specified by the first control message (e.g., session 40) (604). In response to the determination, router 110A sends a second control message configured to request second metadata for reestablishing session 40 (606). Router 110B receives the second control message (608). In response to receiving the second control message, router 110B forwards a second packet of the reverse packet flow of session 40 to router 110A, wherein the second packet includes the second metadata for session 40 (610).

In this example, router 110A determines that the second metadata is insufficient to reestablish session 40 (612). In this example, routers 110A, 110B may be unable to reestablish session 40 from the information contained within the second metadata of the reverse packet flow alone. In response to this determination, router 110A sends a third control message configured to cause router 110B to delete an entry for session 40 from a session entry table of router 110B (614). Router 110B receives the third control message (614), and in response to receiving the third control message, router 110B deletes the entry for session 40 from a session entry table of router 110B (616).

Subsequently, router 110B may receive, e.g., from client device 100B, a second packet of the reverse packet flow of session 40. Because router 110B has deleted the state data for session 40 from its session entry table, router 110B interprets the second packet of the reverse packet flow of session 40 as a first packet of a forward packet flow of a new session. Therefore, router 110B defines new state data for the new session, and forwards this packet to router 110A. It may be seen, therefore, that for session 40, router 110A operated as an ingress network device and router 110B operated as an egress network device. However, upon defining the new session, the roles of router 110A and router 110B reverse, such that router 110B operates as the ingress network device and router 110A operates as the egress network device for the new session. This may enable recovery of session 40 where reestablishment using the aforementioned session health check control message is infeasible.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A first network device comprising:
   processing circuitry in communication with storage media, the processing circuitry configured to:
   send a first packet of a forward packet flow to a second network device, wherein a session between a first client device and a second client device comprises the forward packet flow and a reverse packet flow, wherein the first packet originates from the first client device, and wherein the first packet includes a first header, a first payload, and is modified by the first network device to include first metadata comprising a first control message configured to query a health of the session;
   receive, from the second network device, a second control message configured to request second metadata for reestablishing the session; and
   in response to receiving the second control message, send a second packet of the forward packet flow to the second network device, wherein the second packet originates from the first client device, and wherein the second packet includes a second header, a second payload, and is modified by the first network device to include the second metadata for reestablishing the session.

2. The first network device of claim 1, wherein the second metadata comprises a session identifier for the session.

3. The first network device of claim 2, wherein the session identifier is a 5-tuple comprising a source address and a source port for the first client device, a destination address and a destination port for the second client device, and a network protocol.

4. The first network device of claim 1, wherein the first network device comprises an ingress router of a service provider network and the second network device comprises an egress router of the service provider network.

5. The first network device of claim 1,
   wherein the first control message configured to query the health of the session comprises a type-length-value (TLV) message that includes a message type, a message length, and a message value, and
   wherein the message value specifies at least one of a session health check request or a session timeout request.

6. The first network device of claim 1, wherein the processing circuitry is configured to modify the first packet to include the first control message in response to determining that the first network device has not received a packet of the reverse packet flow of the session from the second network device for a predetermined amount of time.

7. The first network device of claim 1, wherein the processing circuitry is further configured to:
   receive, from the second network device, a second packet of a second forward packet flow comprising third metadata comprising a third control message configured to query a health of a second session comprising the second forward packet flow and a second reverse packet flow;
   determine that the first network device does not possess state data for the second session specified by the third control message;
   in response to determining that the first network device does not include the state data for the second session, send, to the second network device, a fourth control message configured to request fourth metadata for reestablishing the second session;
   receive, from the second network device, a third packet including the fourth metadata for reestablishing the second session; and
   define the state data for the second session based on the fourth metadata.

8. The first network device of claim 7, wherein the processing circuitry is configured to:
   prior to receiving the third packet including the fourth metadata for the second session, receive, from the second network device, a fourth packet for the second session that does not include metadata for the second session;
   determine that the first network device does not possess state data for the second session; and
   drop the fourth packet in response to determining that the first network device does not include state data for the second session.

9. The first network device of claim 7, wherein to determine that the first network device does not possess state data for the second session, the processing circuitry is configured to determine that a session table of the first network device does not include an entry for the session specified by the third control message.

10. The first network device of claim 1, wherein the second control message configured to request second metadata for reestablishing the session is sent in response to the first control message configured to query the health of the session.

11. A method, comprising:

sending, by a first network device, a first packet of a forward packet flow to a second network device, wherein a session between a first client device and a second client device comprises the forward packet flow and a reverse packet flow, wherein the first packet originates from the first client device, and wherein the first packet includes a first header, a first payload, and is modified by the first network device to include first metadata comprising a first control message configured to query a health of the session;

receiving, by the first network device and from the second network device, a second control message configured to request second metadata for reestablishing the session; and in response to receiving the second control message, sending, by the first network device, a second packet of the forward packet flow to the second network device, wherein the second packet originates from the first client device, and wherein the second packet includes a second header, a second payload, and is modified by the first network device to include the second metadata for reestablishing the session.

12. The method of claim 11, wherein the second metadata comprises a session identifier for the session.

13. The method of claim 12, wherein the session identifier is a 5-tuple comprising a source address and a source port for the first client device, a destination address and a destination port for the second client device, and a network protocol.

14. The method of claim 11, wherein the first network device comprises an ingress router of a service provider network and the second network device comprises an egress router of the service provider network.

15. The method of claim 11, wherein the first control message configured to query the health of the session comprises a type-length-value (TLV) message that includes a message type, a message length, and a message value, and wherein the message value specifies at least one of a session health check request or a session timeout request.

16. The method of claim 11, further comprising modifying, by the first network device, the first packet to include the first control message in response to determining that the first network device has not received a packet of the reverse packet flow of the session from the second network device for a predetermined amount of time.

17. The method of claim 11, further comprising:

receiving, by the first network device and from the second network device, a second packet of a second forward packet flow comprising third metadata comprising a third control message configured to query a health of a second session comprising the second forward packet flow and a second reverse packet flow;

determining, by the first network device, that the first network device does not possess state data for the second session specified by the third control message;

in response to determining that the first network device does not include the state data for the second session, sending, by the first network device and to the second network device, a fourth control message configured to request fourth metadata for reestablishing the second session;

receiving, by the first network device and from the second network device, a third packet including the fourth metadata for reestablishing the second session; and defining, by the first network device, the state data for the second session based on the fourth metadata.

18. The method of claim 17, further comprising:

prior to receiving the third packet including the fourth metadata for the second session, receiving, by the first network device and from the second network device, a fourth packet for the second session that does not include metadata for the second session;

determining, by the first network device, that the first network device does not possess state data for the second session; and dropping, by the first network device, the fourth packet in response to determining that the first network device does not include state data for the second session.

19. The method of claim 17, wherein determining that the first network device does not possess state data for the second session comprises determining that a session table of the first network device does not include an entry for the session specified by the third control message.

20. Non-transitory, computer-readable storage media comprising instructions that, when executed, cause processing circuitry of a first network device to:

send a first packet of a forward packet flow to a second network device, wherein a session between a first client device and a second client device comprises the forward packet flow and a reverse packet flow, wherein the first packet originates from the first client device, and wherein the first packet includes a first header, a first payload, and is modified by the first network device to include first metadata comprising a first control message configured to query a health of the session;

receive, from the second network device, a second control message configured to request second metadata for reestablishing the session; and in response to receiving the second control message, send a second packet of the forward packet flow to the second network device, wherein the second packet originates from the first client device, and wherein the second packet includes a second header, a second payload, and is modified by the first network device to include the second metadata for reestablishing the session.

* * * * *